(12) United States Patent
Zhou et al.

(10) Patent No.: US 11,186,099 B2
(45) Date of Patent: Nov. 30, 2021

(54) INKJET PRINTING METHOD AND APPARATUS

(71) Applicant: HEWLETT-PACKARD DEVELOPMENT COMPANY, L.P., Spring, TX (US)

(72) Inventors: Zhang-Lin Zhou, San Diego, CA (US); Rodney David Stramel, San Diego, CA (US); Gregg A. Lane, San Diego, CA (US); Shao-Wei Li, San Diego, CA (US); Brian J. Keefe, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/618,732

(22) PCT Filed: Sep. 25, 2017

(86) PCT No.: PCT/US2017/053285
§ 371 (c)(1),
(2) Date: Dec. 2, 2019

(87) PCT Pub. No.: WO2019/059948
PCT Pub. Date: Mar. 28, 2019

(65) Prior Publication Data
US 2020/0164661 A1    May 28, 2020

(51) Int. Cl.
*B41J 11/00* (2006.01)
*B41J 2/175* (2006.01)
(Continued)

(52) U.S. Cl.
CPC .............. *B41J 11/002* (2013.01); *B41J 2/175* (2013.01); *B41J 2/2103* (2013.01); *C09D 11/322* (2013.01); *B41J 2002/012* (2013.01)

(58) Field of Classification Search
CPC .. B41J 2/04536; B41J 2/04586; B41J 11/002; B41J 2/175; B41J 2/2103;
(Continued)

(56) References Cited

U.S. PATENT DOCUMENTS 5,389,958 A * 2/1995 Bui ................... B41J 2/005
347/102
6,354,700 B1 * 3/2002 Roth ................. B41J 2/0057
347/102
(Continued)

FOREIGN PATENT DOCUMENTS

GB    2322597        9/1998
GB    2512429 A     10/2014
(Continued)

OTHER PUBLICATIONS

Araki, K et al., Development of a UV Inkjet System for Printing Flexible Packaging, 2016 http://www.fujifilm.com/about/research/report/061/pdf/index/ff_rd061_003_en.pdf.

*Primary Examiner* — Thinh H Nguyen
(74) *Attorney, Agent, or Firm* — Dicke Billig & Czaja PLLC

(57) ABSTRACT

Herein is disclosed a method of transfer inkjet printing comprising jetting a radiation curable inkjet ink onto an intermediate transfer member of an inkjet printer to form an image; irradiating the radiation curable inkjet ink on the intermediate transfer member to form an at least partially cured image; and transferring the at least partially cured image to a substrate to form a printed substrate. Herein is also disclosed a transfer inkjet printing apparatus adapted, in use, to perform the method.

20 Claims, 1 Drawing Sheet

(51) Int. Cl.
*B41J 2/21* (2006.01)
*C09D 11/322* (2014.01)
*B41J 2/01* (2006.01)

(58) Field of Classification Search
CPC ............ B41J 2002/012; C09D 11/037; C09D 11/101; C09D 11/104; B41M 5/0023
See application file for complete search history.

(56) References Cited

U.S. PATENT DOCUMENTS

| | | | |
|---|---|---|---|
| 6,447,112 | B1 | 9/2002 | Hu et al. |
| 8,133,551 | B2 | 3/2012 | Claes |
| 8,235,517 | B2 | 8/2012 | Grant et al. |
| 8,272,729 | B2 | 9/2012 | Caiger et al. |
| 8,857,977 | B2 | 10/2014 | Grant et al. |
| 10,274,855 | B2 * | 4/2019 | Ron ................ G03G 9/1355 |
| 2002/0044188 | A1 | 4/2002 | Codos |
| 2009/0056749 | A1 | 3/2009 | Hori et al. |
| 2009/0318613 | A1 | 12/2009 | Ageishi et al. |
| 2011/0058000 | A1 | 3/2011 | Rodin et al. |
| 2011/0211012 | A1 | 9/2011 | Irita |
| 2014/0285568 | A1 | 9/2014 | Loccufier et al. |
| 2015/0049134 | A1 | 2/2015 | Shmaiser et al. |
| 2016/0159110 | A1 | 6/2016 | Beier et al. |
| 2016/0271970 | A1 | 9/2016 | Lllsley et al. |
| 2016/0307078 | A1 | 10/2016 | Akazawa et al. |
| 2016/0376453 | A1 | 12/2016 | Hearon |
| 2018/0354249 | A1 | 12/2018 | Martinez de Leon et al. |

FOREIGN PATENT DOCUMENTS

| | | |
|---|---|---|
| GB | 2540011 A | 1/2017 |
| WO | WO-2009747480 A1 | 12/1997 |
| WO | WO-2013132418 A2 | 9/2013 |
| WO | WO-2013175213 | 11/2013 |
| WO | WO-2015116028 A1 | 8/2015 |
| WO | WO-2017069729 | 4/2017 |

* cited by examiner

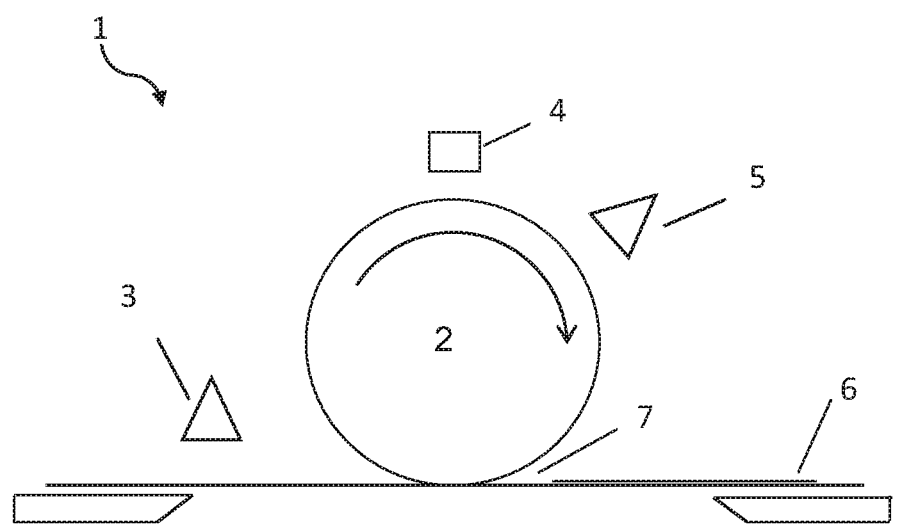

INKJET PRINTING METHOD AND APPARATUS

CROSS-REFERENCE TO RELATED APPLICATIONS

This Utility Patent Application is a U.S. National Stage filing under 35 U.S.C. § 371 of PCT/US2017/053285, filed Sep. 25, 2017, incorporated by reference herein.

BACKGROUND

Inkjet printing is a printing method that utilizes electronic signals to control and direct droplets or a stream of ink to be deposited on a substrate to form an image. Some commercial and industrial inkjet printers utilize fixed print heads and a moving substrate web in order to achieve high speed printing.

BRIEF DESCRIPTION OF THE DRAWINGS

FIG. 1 illustrates schematically an example of a printing apparatus as described herein.

DETAILED DESCRIPTION

Before the present disclosure is disclosed and described, it is to be understood that his disclosure is not restricted to the particular process features and materials disclosed herein because such process features and materials may vary somewhat. It is also to be understood that the terminology used herein is used for the purpose of describing particular examples.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which resins, pigment particles, colorants, and/or other additives can be dispersed to form an ink jet ink. The carrier liquids may include a mixture of a variety of different agents, such as surfactants, co-solvents, viscosity modifiers, and/or other possible ingredients.

As used herein, "pigment" generally includes pigment colorants, magnetic particles, aluminas, silicas, and/or other ceramics or organo-metallics, whether or not such particulates impart colour. Thus, though the present description primarily exemplifies the use of pigment colorants, the term "pigment" can be used more generally to describe not just pigment colorants, but other pigments such as organometallics, ferrites, ceramics, etc.

As used herein, "co-polymer" refers to a polymer that is polymerized from at least two monomers.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" may refer to nitrogen, oxygen, halogens, phosphorus, or sulfur.

As used herein, "alkyl", or similar expressions such as "alk" in alkoxy, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more, and may be selected from, phenyl and naphthyl.

As used herein, the term "intermediate transfer member" is to be used interchangeably with the term "transfer blanket", and refers to a rubber or silicone coated roller or drum of the inkjet printing apparatus onto which a composition is jetted. The transfer member is termed intermediate due to being located intermediate the printhead and the print substrate. The printed composition is irradiated on the intermediate transfer member before being transferred to a final print substrate. Such transfer members are known from offset or electrostatic printing processes.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable as would be understood in the art.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not just the explicitly recited values of about 1 wt. % to about 5 wt. %, but also include individual values and subranges within the indicated range. Thus, included in this numerical range are individual values such as 2, 3.5, and 4 and sub-ranges such as from 1-3, from 2-4, and from 3-5, and so forth. This same principle applies to ranges reciting a single numerical value. Furthermore, such an interpretation should apply regardless of the breadth of the range or the characteristics being described.

As used herein, unless otherwise stated, wt. % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect, there is provided a method of transfer inkjet printing comprising:
  jetting a radiation curable inkjet ink onto an intermediate transfer member of an inkjet printer to form an image;
  irradiating the radiation curable inkjet ink on the intermediate transfer member to form an at least partially cured image; and
  transferring the at least partially cured image to a substrate to form a printed substrate.

In another aspect, there is provided a transfer inkjet printing apparatus comprising:
  an intermediate transfer member;
  an inkjet print head; and
  a radiation source;
  wherein the transfer inkjet printing apparatus is adapted, in use, to jet a radiation curable inkjet ink onto the intermediate transfer member; and irradiate the radiation curable inkjet ink to at least partially cure the radiation curable inkjet ink on the intermediate transfer member.

High speed industrial transfer inkjet printing requires a good balance between high durability of the printed image and good print head reliability. Transfer printing requires a method that efficiently transfers an image from the intermediate transfer member (sometimes referred to as a blanket) to the substrate. The present inventors have found that by at least partially curing the radiation curable inkjet ink whilst it is on the intermediate transfer member results in reduced bleed and coalescence, as well as resulting in easier and more complete transfer of the at least partially cured image to the substrate. Furthermore, this method of transfer inkjet printing increases the optical density and gloss of the printed images.

Method of Transfer Inkjet Printing

In an aspect, there is provided a method of transfer inkjet printing. The method of transfer inkjet printing comprises: jetting a radiation curable inkjet ink onto an intermediate transfer member of an inkjet printer to form an image; irradiating the radiation curable inkjet ink on the intermediate transfer member to form an at least partially cured image; and transferring the at least partially cured image to a substrate to form a printed substrate.

In some examples, the method of transfer inkjet printing further comprises at least partially drying the radiation curable inkjet ink before irradiating the radiation curable inkjet ink. In some examples, at least partially drying the radiation curable inkjet ink comprises removing at least some liquid carrier from the inkjet ink. In some examples, removing at least some of the liquid carrier from the inkjet ink comprises removing at least 50 wt. % of the liquid carrier, in some examples, at least 55 wt. %, in some examples, at least 60 wt. %, in some examples, at least 65 wt. %, in some examples, at least 70 wt. %, in some examples, at least 75 wt. %, in some examples, at least 80 wt. %, in some examples, at least 85 wt. %, in some examples, at least 90 wt. %, in some examples, at least 95 wt. %, in some examples, at least 99 wt. % of the liquid carrier. In some examples, the method of transfer inkjet printing further comprises fully drying the radiation curable inkjet ink before irradiating the radiation curable inkjet ink.

In some examples, the method of transfer inkjet printing further comprises drying the at least partially cured image after transferring the at least partially cured image to a substrate to form a printed substrate.

In some examples, drying an inkjet ink is accomplished by directing dry radiant heat or a flow of hot air at the inkjet ink on the intermediate transfer member. In some examples, drying an inkjet ink is aided by a vacuum drying system which removes the vapour produced on drying.

In some examples, drying is accomplished by heating the intermediate transfer member. In some examples, the intermediate transfer member is heated before the inkjet ink is jetted onto the intermediate transfer member. In some examples, the intermediate transfer member is heated to at least 50° C., in some examples, at least 55° C., in some examples, at least 60° C., in some examples, at least 65° C., in some examples, at least 70° C., in some examples, at least 75° C., in some examples, at least 80° C., in some examples, at least 85° C., in some examples, at least 90° C., in some examples, at least 95° C., in some examples, at least 100° C., in some examples, at least 105° C., in some examples, at least 110° C., in some examples, at least 115° C., in some examples, at least 120° C., in some examples, at least 125° C., in some examples, at least 130° C., in some examples, at least 135° C., in some examples, at least 140° C., in some examples, at least 145° C., in some examples, about 150° C. In some examples, the intermediate transfer member is heated to 150° C. or less, in some examples, 145° C. or less, in some examples, 140° C. or less, in some examples, 135° C. or less, in some examples, 130° C. or less, in some examples, 125° C. or less, in some examples, 120° C. or less, in some examples, 115° C. or less, in some examples, 110° C. or less, in some examples, 105° C. or less, in some examples, 100° C. or less, in some examples, 95° C. or less, in some examples, 90° C. or less, in some examples, 85° C. or less, in some examples, 80° C. or less, in some examples, 75° C. or less, in some examples, 70° C. or less, in some examples, 65° C. or less, in some examples, about 50° C. In some examples, the intermediate transfer member is heated to about 50° C. to about 150° C., in some examples, about 55° C. to about 145° C., in some examples, about 60° C. to about 140° C., in some examples, about 65° C. to about 135° C., in some examples, about 70° C. to about 130° C., in some examples, about 75° C. to about 125° C., in some examples, about 80° C. to about 120° C., in some examples, about 85° C. to about 115° C., in some examples, about 90° C. to about 110° C., in some examples, about 95° C. to about 105° C., in some examples, about 95° C. to about 100° C., in some examples, about 100° C. to about 105° C.

In some examples, drying is accomplished by directing a flow of gas, for example, air, at the inkjet ink on the intermediate transfer member. In some examples, drying is accomplished by directing a flow of heated gas, for examples, hot air, at the inkjet ink on the intermediate transfer member. In some examples, the air is heated to at least 50° C., in some examples, at least 55° C., in some examples, at least 60° C., in some examples, at least 65° C., in some examples, at least 70° C., in some examples, at least 75° C., in some examples, at least 80° C., in some examples, at least 85° C., in some examples, at least 90° C., in some examples, at least 95° C., in some examples, at least 100° C., in some examples, at least 105° C., in some examples, at least 110° C., in some examples, at least 115° C., in some examples, at least 120° C., in some examples, at least 125° C., in some examples, at least 130° C., in some examples, at least 135° C., in some examples, at least 140° C., in some examples, at least 145° C., in some examples, about 150° C. In some examples, the air is heated to 150° C. or less, in some examples, 145° C. or less, in some examples, 140° C. or less, in some examples, 135° C. or less, in some examples, 130° C. or less, in some examples, 125° C. or less, in some examples, 120° C. or less, in some examples, 115° C. or less, in some examples, 110° C. or less, in some examples, 105° C. or less, in some examples, 100° C. or less, in some examples, 95° C. or less, in some examples, 90° C. or less, in some examples, 85° C. or less, in some examples, 80° C. or less, in some examples, 75° C. or less, in some examples, 70° C. or less, in some examples, 65° C. or less, in some examples, about 50° C. In some examples, the air is heated to about 50° C. to about 150° C., in some examples, about 55° C. to about 145° C., in some examples, about 60° C. to about 140° C., in some examples, about 65° C. to about 135° C., in some examples, about 70° C. to about 130° C., in some examples, about 75° C. to about 125° C., in some examples, about 80° C. to about 120° C., in some examples, about 85° C. to about 115° C., in some examples, about 90° C. to about 110° C., in some examples, about 95° C. to about 105° C., in some examples, about 95° C. to about 100° C. in some examples, about 100° C. to about 105° C.

In some examples, the method of transfer inkjet printing further comprises irradiating the at least partially cured image on the substrate to form the printed substrate.

In some examples, the method of transfer inkjet printing comprises irradiating the radiation curable inkjet ink on the intermediate transfer member to form a fully cured image.

In some examples, the method of transfer inkjet printing comprises irradiating with visible light, ultraviolet light, electron beam irradiation, ionising radiation, non-ionising radiation, or any combination thereof. In some examples, ionising radiation comprises gamma rays. In some examples, non-ionising radiation comprises microwave irradiation. In some examples, the method of transfer inkjet printing comprises irradiating with ultraviolet light.

In some examples, the method of transfer inkjet printing comprises irradiating at a wavelength of about 10 nm to about 600 nm, in some examples, about 100 nm to about 550 nm, in some examples, about 200 nm to about 500 nm, in some examples, about 300 to about 450 nm, in some examples, about 310 nm to about 440 nm, in some examples, about 320 nm to about 430 nm, in some examples, about 330 nm to about 420 nm, in some examples about 340 nm to about 410 nm, in some examples, about 350 nm to about 405 nm, in some examples, about 360 nm to about 400 nm, in some examples, about 365 nm to about 390 nm, in some examples, about 370 nm to about 385 nm, in some examples, about 375 nm to about 380 nm. In some examples, the method of transfer inkjet printing comprises irradiating at a wavelength of about 360 nm to about 370 nm, in some examples, about 380 nm to about 390 nm, in some examples, about 390 nm to about 400 nm, in some examples, about 400 nm to about 410 nm. In some examples, the method of transfer inkjet printing comprises irradiating at a wavelength of about 365 nm, about 385 nm, about 395 nm or about 405 nm.

In some examples, the radiation curable inkjet ink on the intermediate transfer member is irradiated for 10 μs or more, in some examples, 50 μs or more, in some examples, 100 μs or more, in some examples, 200 μs or more, in some examples, 300 μs or more, in some examples, 400 μs or more, in some examples, 500 μs or more, in some examples, 600 μs or more, in some examples, 700 μs or more, in some examples, 800 μs or more, in some examples, 900 μs or more, in some examples, 1 ms or more, in some examples, 10 ms or more, in some examples, 100 ms or more, in some examples, 500 ms or more, in some examples, 1 s or more, in some examples, about 10 s. In some examples, the radiation curable inkjet ink on the intermediate transfer member is irradiated for 10 s or less, in some examples, 1 s or less, in some examples, 500 ms or less, in some examples, 100 ms or less, in some examples, 10 ms or less, in some examples, 1 ms or less, in some examples, 900 μs or less, in some examples, 800 μs or less, in some examples, 700 μs or less, in some examples, 600 μs or less, in some examples, 500 μs or less, in some examples, 400 μs or less, in some examples, 300 μs or less, in some examples, 200 μs or less, in some examples, 100 μs or less, in some examples, 50 μs or less, in some examples, about 10 μs. In some examples, the radiation curable inkjet ink on the intermediate transfer member are irradiated for about 10 μs to about 10 s, in some examples, about 50 μs to about 1 s, in some examples, about 100 μs to about 500 ms, in some examples, about 200 μs to about 100 ms, in some examples, about 300 μs to about 10 ms, in some examples, about 400 μs to about 1 ms, in some examples, about 500 μs to about 900 μs, in some examples, about 600 μs to about 800 μs, in some examples, about 600 μs to about 700 μs, in some examples, about 700 μs to about 800 μs.

Transfer Inkjet Printing Apparatus

In an aspect, there is provided a transfer inkjet printing apparatus comprising an intermediate transfer member; an inkjet print head; and a radiation source; wherein the transfer inkjet printing apparatus is adapted, in use, to jet a radiation curable inkjet ink onto the intermediate transfer member; and irradiate the radiation curable inkjet ink to at least partially cure the radiation curable inkjet ink on the intermediate transfer member.

In some examples, the radiation source is selected from a visible light source, an ultraviolet light source, an electron beam source, an ionising radiation source, a non-ionising radiation source, or a combination thereof. In some examples, the ionising radiation source is a source of gamma rays. In some examples, the non-ionising radiation source is a microwave source. In some examples, the radiation source is an ultraviolet light source. In some examples, the radiation source is an LED UV lamp, a Hg UV lamp, a Xenon arc lamp, or a microwave UV lamp. In some examples, the Xenon arc lamp is selected from a pure xenon arc lamp or a xenon-mercury arc lamp. In some examples, the radiation source is an LED UV lamp.

In some examples, the transfer inkjet printing apparatus may comprise a drying station, wherein the drying station is adapted, in use, to at least partially dry the radiation curable inkjet ink on the intermediate transfer member. In some examples, the apparatus is adapted, in use, to at least partially dry the radiation curable inkjet ink on the intermediate transfer member before the radiation curable inkjet ink is irradiated.

In some examples, the transfer inkjet printing apparatus may comprise a second radiation source, wherein the second radiation source is adapted, in use, to irradiate the at least partially cured image on the substrate to form the printed substrate. In some examples, the transfer inkjet printing apparatus may comprise a second radiation source, wherein the second radiation source is adapted, in use, to irradiate the at least partially cured image on the substrate to form a fully cured image on the substrate to form the printed substrate.

The second radiation source differs from the radiation source that irradiates the radiation curable inkjet ink on the intermediate transfer member, which may be termed a first radiation source if a second radiation source is present.

In some examples, the transfer inkjet printing apparatus may comprise a drying station that is adapted, in use, to dry the image on the substrate to form the printed substrate.

FIG. 1 shows a schematic illustration of a transfer inkjet printing apparatus 1. An image, including any combination of graphics, text and images, may be communicated to the transfer inkjet printing apparatus 1. According to an illustrative example, an inkjet print head 4 jets a radiation curable inkjet ink onto the intermediate transfer member 2 to form an image. In some examples, the image is then at least partially dried at a drying station (not shown). Next, the image is irradiated by a radiation source 5 to form an at least partially cured image. In some examples, the image is irradiated by the radiation source 5 to form a fully cured image. The at least partially cured image is then transferred to a substrate 6 at an image transfer station 7. Once the image has been transferred to the substrate 6, a second radiation source 3 may further irradiate the at least partially cured image to form a fully cured image. If the image was fully cured through irradiation by the radiation source 5, no second radiation source 3 may be present. In some examples, before or after irradiation by the second radiation source, the at least partially cured image may be dried by a drying station (not shown).

Radiation Curable Inkjet Ink

In some examples, the radiation curable inkjet ink comprises a radiation curable resin.

In some examples, the radiation curable inkjet ink comprises a liquid carrier. In some examples, the radiation curable inkjet ink comprises a radiation curable resin and a liquid carrier. In some examples, the radiation curable inkjet ink comprises a radiation curable resin dispersed in a liquid carrier.

In some examples, the radiation curable inkjet ink comprises a photoinitiator. In some examples, the radiation curable inkjet ink comprises a radiation curable resin and a photoinitiator. In some examples, the radiation curable inkjet ink comprises a radiation curable resin, a photoinitiator and a liquid carrier. In some examples, the radiation curable inkjet ink comprises a radiation curable resin and a photoinitiator dispersed in a liquid carrier.

In some examples, the radiation curable inkjet ink comprises a diluent. In some examples, the diluent is a reactive diluent. In some examples, the radiation curable inkjet ink comprises a radiation curable resin and a diluent. In some examples, the radiation curable inkjet ink comprises a radiation curable resin, a diluent and a liquid carrier. In some examples, the radiation curable inkjet ink comprises a radiation curable resin and a diluent dispersed in a liquid carrier. In some examples, a radiation curable inkjet ink comprises a radiation curable resin, a photoinitiator and a diluent. In some examples, the radiation curable inkjet ink comprises a radiation curable resin, a photoinitiator, a diluent and a liquid carrier. In some examples, the radiation curable inkjet ink comprises a radiation curable resin, a photoinitiator and a diluent dispersed in a liquid carrier.

In some examples, the radiation curable inkjet ink comprises a colorant. In some examples, the radiation curable inkjet ink comprises a colorant and a radiation curable resin. In some examples, the radiation curable inkjet ink comprises a colorant, a radiation curable resin and a liquid carrier. In some examples, the radiation curable inkjet ink comprises a radiation curable resin and a colorant dispersed in a liquid carrier. In some examples, the radiation curable inkjet ink comprises a radiation curable resin, a photoinitiator and a colorant. In some examples, the radiation curable inkjet ink comprises a radiation curable resin, a photoinitiator, a colorant and a liquid carrier. In some examples, the radiation curable inkjet ink comprises a radiation curable resin, a photoinitiator, a diluent and a colorant. In some examples, the radiation curable inkjet ink comprises a radiation curable resin, a diluent and a colorant. In some examples, the radiation curable inkjet ink comprises a radiation curable resin, a photoinitiator, a diluent, a colorant and a liquid carrier. In some examples, the radiation curable inkjet ink comprises a radiation curable resin, a photoinitiator, a diluent and a colorant dispersed in a liquid carrier.

In some examples, the radiation curable resin may be a polymer. In some examples, the polymer may be a thermoplastic polymer.

In some examples, the radiation curable inkjet ink is a pH stable radiation curable inkjet ink. In some examples, the radiation curable resin in the radiation curable inkjet ink is a pH stable dispersion in a carrier liquid.

Radiation Curable Resins

In some examples, the radiation curable inkjet ink comprises 30 wt. % or more radiation curable resin, in some examples, 35 wt. % or more, in some examples, 40 wt. % or more, in some examples, 45 wt. % or more, in some examples, 50 wt. % or more, in some examples, 55 wt. % or more, in some examples, about 60 wt. % radiation curable resin. In some examples, the radiation curable inkjet ink comprises 60 wt. % or less, in some examples, 55 wt. % or less, in some examples, 50 wt. % or less, in some examples, 45 wt. % or less, in some examples, 40 wt. % or less, in some examples, 35 wt. % or less, in some examples, about 30 wt. % radiation curable resin. In some examples, the radiation curable inkjet ink comprises 30 wt. % to 60 wt. % radiation curable resin, in some examples, 35 wt. % to 55 wt. %, in some examples, 40 wt. % to 50 wt. %, in some examples, 45 wt. % to 50 wt. %, in some examples, 40 wt. % to 45 wt. % radiation curable resin.

In some examples, the radiation curable inkjet ink comprises a radiation curable resin and a liquid carrier and the radiation curable inkjet ink comprises 0.1 wt. % or more radiation curable resin, in some examples, 0.2 wt. % or more, in some examples, 0.3 wt. % or more, in some examples, 0.4 wt. % or more, in some examples, 0.5 wt. % or more, in some examples, 0.6 wt. % or more, in some examples, 0.7 wt. % or more, in some examples, 0.8 wt. % or more, in some examples, 0.9 wt. % or more, in some examples, 1 wt. % or more, in some examples, 2 wt. % or more, in some examples, 3 wt. % or more, in some examples, 4 wt. % or more, in some examples, 5 wt. % or more, in some examples, 6 wt. % or more, in some examples, 7 wt. % or more, in some examples, 8 wt. % or more, in some examples, 9 wt. % or more, in some examples, 10 wt. % or more, in some examples, 11 wt. % or more, in some examples, 12 wt. % or more, in some examples, 13 wt. % or more, in some examples, 14 wt. % or more, in some examples, 15 wt. % or more, in some examples, 20 wt. % or more, in some examples, 25 wt. % or more, in some examples, about 30 wt. % radiation curable resin. In some examples, the radiation curable inkjet ink comprises a radiation curable resin and a liquid carrier and the radiation curable inkjet ink comprises 30 wt. % or less radiation curable resin, in some examples, 25 wt. % or less, in some examples, 20 wt. % or less, in some examples, 15 wt. % or less, in some examples, 14 wt. % or less, in some examples, 13 wt. % or less, in some examples, 12 wt. % or less, in some examples, 11 wt. % or less, in some examples, 10 wt. % or less, in some examples, 9 wt. % or less, in some examples, 8 wt. % or less, in some examples, 7 wt. % or less, in some examples, 6 wt. % or less, in some examples, 5 wt. % or less, in some examples, 4 wt. % or less, in some examples, 3 wt. % or less, in some examples, 2 wt. % or less, in some examples, 1 wt. % or less, in some examples, 0.9 wt. % or less, in some examples, 0.8 wt. % or less, in some examples, 0.7 wt. % or less, in some examples, 0.6 wt. % or less, in some examples, 0.5 wt. % or less, in some examples, 0.4 wt. % or less, in some examples, 0.3 wt. % or less, in some examples, 0.2 wt. % or less, in some examples, about 0.1 wt. % radiation curable resin. In some examples, the radiation curable inkjet ink comprises a radiation curable resin and a liquid carrier and the radiation curable inkjet ink comprises 0.1 wt. % to 30 wt. % radiation curable resin, in some examples, 0.2 wt. % to 25 wt. %, in some examples, 0.3 wt. % to 20 wt. %, in some examples, 0.4 wt. % to 15 wt. %, in some examples, 0.5 wt. % to 14 wt. %, in some examples, 0.6 wt. % to 13 wt. %, in some examples, 0.7 wt. % to 12 wt. %, in some examples, 0.8 wt. % to 11 wt. %, in some examples, 0.9 wt. % to 10 wt. %, in some examples, 1 wt. % to 9 wt. %, in some examples, 2 wt. % to 8 wt. %, in some examples, 3 wt. % to 7 wt. %, in some examples, 4 wt. % to 6 wt. %, in some examples, 5 wt. % to 6 wt. %, in some examples, 4 wt. % to 5 wt. % radiation curable resin.

In some examples, the radiation curable resin comprises a resin selected from acrylic resin and polyurethane-based resin. In some examples, the radiation curable resin may be any radiation curable polyurethane resin.

In some examples, the radiation curable resin comprises an acrylic resin, which may be used in the radiation curable inkjet ink in combination with a carrier liquid comprising water and therefore in the form of an acrylic resin aqueous dispersion. In some examples, the acrylic resin aqueous dispersion may comprise 30 wt. % to 70 wt. % acrylic resin, in some examples, 35 wt. % to 65 wt. %, in some examples, 40 wt. % to 60 wt. %, in some examples, 45 wt. % to 55 wt. %, in some examples, 50 wt. % to 55 wt. % acrylic resin.

In some examples, the radiation curable resin may be a UV curable resin, for example, a UV curable resin curable by UV-LED.

In some examples, the radiation curable resin comprises a radiation curable polyurethane resin, a radiation curable acrylate resin, or a radiation curable methacrylate resin.

In some examples, the radiation curable polyurethane resin may be selected from acrylated polyurethane resins or methacrylated polyurethane resins.

In some examples, the radiation curable polyurethane resin may be selected from (meth)acrylated polyurethane, sold under the trade names NeoRad® R441 by NeoResins (Avecia). Ucecoat®7710, Ucecoat®7655 (available from Cytec), Neorad®R440, Neorad®R441, Neorad®R447, Neorad®R448 (available from DSM NeoResins), Bayhydrol®UV 2317, Bayhydrol®UV VP LS 2348 (available from Bayer), Lux®430, Lux®399, Lux®484 (available from Alberdingk Boley), Laromer®LR8949, Laromer®LR8983, Laromer® PE22WN, Laromer®PE55WN, Laromer®UA9060 (available from BASF).

In some examples, the radiation curable resin may be a UV-LED curable resin comprising a reactive polyurethane, which may be used in the radiation curable inkjet ink in combination with a carrier liquid and therefore in the form of a polyurethane dispersion. The polyurethane dispersion may include polymer strands with acrylate or methacrylate reactive groups in capping units at the ends of the strands. In some examples, a reactive polyurethane dispersion can include a polymer strand that has a polymer backbone having two ends, the first end terminating with a first capping unit and the second end terminating with a second capping unit. The polymer backbone may be formed of polymerized monomers including: a reactive diol, which may be selected from an acrylate-containing diol, a methacrylate-containing diol, or a combination thereof; and a blend of two or more diisocyanates. The first capping unit may be a (meth)acrylate-containing monoalcohol that reacts with an isocyanate group of a diisocyanate. The second capping unit may be an ionic stabilizing group. The polymer backbone may be devoid of ionic stabilizing groups. In some examples, the reactive polyurethane dispersion may have an NCO/OH ratio of 1.2 to 10, an acid number of 20 to 100, and/or a double bond density of 1.5 to 10.

In some examples, a reactive polyurethane dispersion may include a polymer strand that has a polymer backbone having two ends, the first end terminating in a first capping unit and the second end terminating in a second capping unit. The polymer backbone may be formed of polymerized monomers including: a blend of two or more diisocyanates, and a reactive diol selected from:

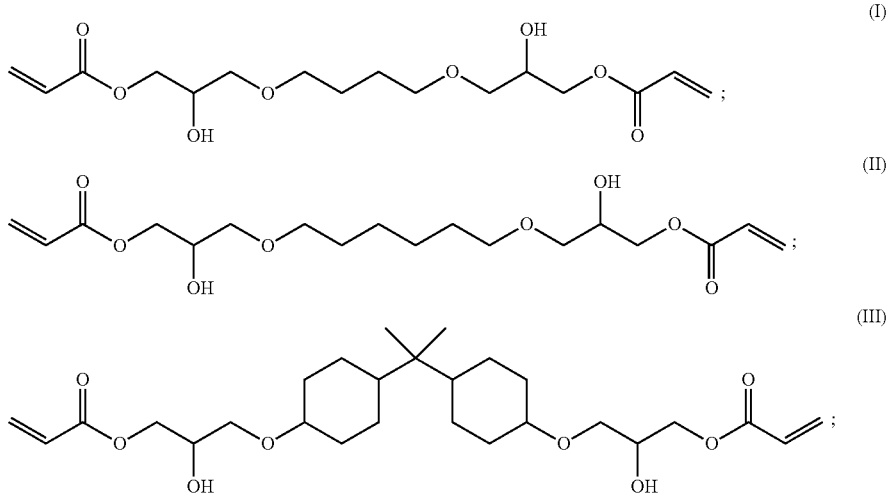

-continued

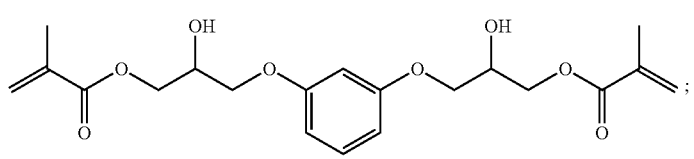

(IV)

or combinations thereof. The first capping unit may be a (meth)acrylate-containing monoalcohol that reacts with an isocyanate group of one of the two or more diisocyanates. The second capping unit may be an ionic stabilizing group.

In some examples, the second capping unit, that is, the ionic stabilizing group may be a carboxylate group or a sulfonate group.

Several types of pH stable and radiation curable polyurethane dispersions can be used as water based, UV-LED curable inks, including hydroxyethyl acrylamide (HEAA)-based polyurethane dispersions; allyl-based (for example, glycidyl amine epoxy (GDAE)-based) polyurethane dispersions (allyl); styrene-based polyurethane dispersions; and 3-(cyclohexylamino)-1-propanesulfonic acid (CAPS) or N-cyclohexyl-2-aminoethanesulfonic acid (CHES) capped acrylate-based polyurethane dispersions.

In some examples, the polyurethane dispersion comprises an acrylamide-based radiation curable polyurethane dispersion. In some examples, the acrylamide-based polyurethane dispersion may be pH stable and ASL stable. ASL stable refers to accelerated storage life stability, and is evaluated by placing the dispersion in an oven at 50° C. for 7 days. In some examples, the acrylamide-based polyurethane may comprise polyurethane synthesised by using reactive acrylate or methacrylate functional groups to form the backbone without using acid stabilizing groups in the backbone and using acrylamide compounds to form a first capping unit and stabilizing groups, such as carboxylate or sulfonate groups, to form a second capping unit. In some examples, the acrylamide-based radiation curable polyurethane dispersion is a hydroxyethyl acrylamide (HEAR)-based polyurethane dispersion.

In some examples, the radiation curable polyurethane dispersion may comprise allyl-based polyurethane dispersions, which may be pH stable and ASL stable. In some examples the acrylamide-based polyurethane may comprise polyurethane synthesised by using reactive acrylate or methacrylate functional groups to form the backbone without using acid stabilizing groups in the backbone and using allyl-based raw materials to form part of the backbone and/or the first capping unit and stabilizing groups, such as carboxylate or sulfonate groups, to form the second capping unit. In some examples, the allyl-based polyurethane dispersion is a glycidyl amine epoxy based polyurethane dispersion.

In some examples, the radiation curable polyurethane dispersion may comprise styrene-based polyurethane dispersions, which may be pH stable and ASL stable. In some examples, the styrene-based polyurethane dispersion may comprise polyurethane synthesised by using reactive acrylate or methacryalte functional groups to form the backbone without using acid stabilizing groups in the backbone and using styrene-based diol or mono-alcohol groups to form part of the backbone and/or the first capping unit; and stabilizing groups, such as carboxylate or sulfonate groups, to form the capping unit.

In some examples, the radiation curable polyurethane dispersion may comprise polyurethane synthesised by combining acrylate or methacrylate raw materials with blends of two isocyanates and a diol without using acid stabilizing groups as part of the backbone. In some examples, the radiation curable polyurethane dispersion may comprise polyurethane synthesized by combining isocyanates with Bisphenol A-free acrylate-based diols.

In some examples, the capping units of the polyurethane comprise a capping unit selected from 3-(cyclohexylamino)-1-propanesulfonic acid (CAPS) and 2-(cyclohexyl-amino) ethanesulfonic acid (CHES).

Liquid Carrier

In some examples, the radiation curable inkjet ink comprises a liquid carrier.

In some examples, the liquid carrier comprises or is water.

In some examples, the liquid carrier constitutes 30 wt. % or more of the radiation curable inkjet ink, in some examples, 35 wt. % or more, in some examples, 40 wt. % or more, in some examples, 45 wt. % or more, in some examples, 50 wt. % or more, in some examples, 55 wt. % or more, in some examples, 60 wt. % or more, in some examples, 65 wt. % or more, in some examples, 70 wt. % or more, in some examples, 75 wt. % or more, in some examples, 80 wt. % or more, in some examples, 85 wt. % or more, in some examples, 90 wt. % or more, in some examples, 91 wt. % or more, in some examples, 92 wt. % or more, in some examples, 93 wt. % or more, in some examples, 94 wt. % or more, in some examples, 95 wt. % or more, in some examples, 96 wt. % or more, in some examples, 97 wt. % or more, in some examples, 98 wt. % or more, in some examples, about 99 wt. % of the radiation curable inkjet ink. In some examples, the liquid carrier constitutes 99 wt. % or less of the radiation curable inkjet ink, in some examples, 98 wt. % or less, in some examples, 97 wt. % or less, in some examples, 96 wt. % or less, in some examples, 95 wt. % or less, in some examples, 94 wt. % or less, in some examples, 93 wt. % or less, in some examples, 92 wt. % or less, in some examples, 91 wt. % or less, in some examples, 90 wt. % or less, in some examples, 85 wt. % or less, in some examples, 80 wt. % or less, in some examples, 75 wt. % or less, in some examples, 70 wt. % or less, in some examples, 65 wt. % or less, in some examples, 60 wt. % or less, in some examples, 55 wt. % or less, in some examples, 50 wt. % or less, in some examples, 45 wt. % or less, in some examples, 40 wt. % or less, in some examples, 35 wt. % or less, in some examples, about 30 wt. % of the radiation curable inkjet ink. In some examples, the liquid carrier constitutes 30 wt. % to 99 wt. % of the radiation curable inkjet ink, in some examples, 35 wt. % to 98 wt. %, in some examples, 40 wt. % to 97 wt. %, in some examples, 45 wt. % to 96 wt. %, in some examples, 50 wt. % to 95 wt. %, in some examples, 55 wt. % to 94 wt. %, in some examples, 60 wt. % to 93 wt. %, in some examples, 65 wt. % to 92 wt. %, in some examples, 70 wt. % to 91 wt. %, in some examples, 75 wt. % to 90 wt. %, in some examples, 80 wt. % to 85 wt. % of the radiation curable inkjet ink.

In some examples, the liquid carrier may comprise water and a co-solvent. In some examples, the co-solvent may be an organic co-solvent, which may be selected from alcohols (e.g., aliphatic alcohols, aromatic alcohols, polyhydric alcohols (e.g., diols), polyhydric alcohol derivatives, long chain alcohols, etc.), glycol ethers, polyglycol ethers, nitrogen-containing co-solvents (e.g., pyrrolidinones, caprolactams, formamides, acetamides, etc.), and sulfur-containing co-solvents, Examples of such organic co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. Still further examples of suitable co-solvents include propylene carbonate and ethylene carbonate.

In some examples, the carrier liquid may comprise water and at least one co-solvent. In some examples, the co-solvents may constitute a total amount of 0 wt. % to 60 wt. % of the radiation curable inkjet ink. In some examples, the co-solvent(s) may constitute from about 1 wt. % to about 30 wt. %, in some examples, about 5 wt. % to about 25 wt. %, in some examples, about 10 wt. % to about 20 wt. %, in some examples, about 15 wt. % to about 20 wt. % of the total wt. % of the radiation curable inkjet ink.

In some examples, the liquid carrier may additionally comprise a surfactant. Any suitable surfactant may be used. Suitable surfactants may be selected from non-ionic, cationic, and/or anionic surfactants. Examples of suitable surfactants include silicone-free alkoxylated alcohol surfactants, such as TEGO® Wet 510 (Evonik Tego Chemie GmbH), self-emulsifiable wetting agents based on acetylenic diol chemistry, such as SURFYNOL® SE-F (Air Products and Chemicals, Inc.). Other suitable commercially available surfactants include SURFYNOL® 465 (ethoxylated acetylenic diol), SURFYNOL® CT 211 (non-ionic, alkylphenylethoxylate and solvent free), SURFYNOL® 104 (non-ionic wetting agent based on acetylenic diol chemistry) (all of which are available from Air Products and Chemicals, Inc.); ZONYL® FSO (a.k.a. CAPSTONE®, which is a water-soluble, ethoxylated non-ionic fluorosurfactant from Dupont); TERGITOL™ TMN-3 and TERGITOL™ TMN-6 (both of which are branched secondary alcohol ethoxylate, non-ionic surfactants), and TERGITOL™ 15-S-3, TERGITOL™ 15-S-5, and TERGITOL™ 15-S-7 (each of which is a secondary alcohol ethoxylate, non-ionic surfactant) (all of the TERGITOL™ surfactants are available from The Dow Chemical Co.). Fluorosurfactants may also be employed.

In some examples, the surfactant constitutes from about 0.01 wt. % to about 5 wt. % based on the total wt. % of the radiation curable inkjet ink.

In some examples, the liquid carrier may further comprise other additives to enhance the properties of the radiation curable inkjet ink for specific applications. Examples of these additives include those added to inhibit the growth of microorganisms, viscosity modifiers, materials for pH adjustment, sequestering agents, anti-kogation agents, preservatives, and the like. Such additives may be present in an amount of 0 wt. % to 5 wt. % of the radiation curable inkjet ink.

Colorant

The radiation curable inkjet ink may comprise a colorant. In some examples, the radiation curable inkjet ink comprises 0.5 wt. % or more colorant, in some examples, 1 wt. % or more, in some examples, 2 wt. % or more, in some examples, 3 wt. % or more, in some examples, 4 wt. % or more, in some examples, 5 wt. % or more, in some examples, 6 wt. % or more, in some examples, 7 wt. % or more, in some examples, 8 wt. % or more, in some examples, 9 wt. % or more, in some examples, 10 wt. % or more, in some examples, 15 wt. % or more, in some examples, 20 wt. % or more, in some examples, 25 wt. % or more, in some examples, 30 wt. % or more, in some examples, 35 wt. % or more, in some examples, about 40 wt. % colorant. In some examples, the radiation curable inkjet ink comprises 40 wt. % or less, in some examples, 35 wt. % or less, in some examples, 30 wt. % or less, in some examples, 25 wt. % or less, in some examples, 20 wt. % or less, in some examples, 15 wt. % or less, in some examples, 10 wt. % or less, in some examples, 9 wt. % or less, in some examples, 8 wt. % or less, in some examples, 7 wt. % or less, in some examples, 6 wt. % or less, in some examples, 5 wt. % or less, in some examples, 4 wt. % or less, in some examples, 3 wt. % or less, in some examples, 2 wt. % or less, in some examples, 1 wt. % or less, in some examples, about 0.5 wt. % colorant. In some examples, the radiation curable inkjet ink comprises 0.5 wt. % to 40 wt. % colorant, in some examples, 1 wt. % to 35 wt. %, in some examples, 2 wt. % to 30 wt. %, in some examples, 3 wt. % to 25 wt. %, in some examples, 4 wt. % to 20 wt. %, in some examples, 5 wt. % to 15 wt. %, in some examples, 6 wt. % to 10 wt. %, in some examples, 7 wt. % to 9 wt. %, in some examples, 8 wt. % to 9 wt. % colorant.

Any colorant suitable for use in an inkjet ink may be used. The colorant may be a pigment or a dye. In some examples, the colorant may be a pigment. As used herein, "pigment" generally includes organic or inorganic pigment colorants, magnetic particles, aluminas, silicas, and/or other ceramics, organometallics or other opaque particles, whether or not such particulates impart colour. Thus, although the present description primarily illustrates the use of pigment colorants, the term "pigment" can be used more generally to describe pigment colorants, as well as other pigments such as organometallics, ferrites, ceramics, and so forth.

Suitable pigments include the following, which are available from BASF Corp.: PALIOGEN® Orange, HELIOGEN® Blue L 6901F, HELIOGEN® Blue NBD 7010, HELIOGEN® Blue K 7090, HELIOGEN® Blue L 7101F, PALIOGEN® Blue L 6470, HELIOGEN® Green K 8683, HELIOGEN® Green L 9140, CHROMOPHTAL® Yellow 3G, CHROMOPHTAL® Yellow GR, CHROMOPHTAL® Yellow 8G, IGRAZIN® Yellow SGT, and IGRALITE® Rubine 4BL, The following pigments are available from Degussa Corp.: Color Black FWI, Color Black FW2, Color Black FW2V, Color Black 18, Color Black, FW200, Color Black 5150, Color Black S160, and Color Black 5170. The following black pigments are available from Cabot Corp.: REGAL® 400R, REGAL® 330R, REGAL® 660R, MOGUL® L, BLACK PEARLS® L, MONARCH® 1400, MONARCH® 1300, MONARCH® 1100, MONARCH® 1000, MONARCH® 900, MONARCH® 880, MONARCH® 800, and MONARCH® 700, The following pigments are available from Orion Engineered Carbons GMBH: PRINTEX® U, PRINTER® V, PRINTER® 140U, PRINTER® 140V, PRINTEX® 35, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: TI-PURE® R-101. The following pigments are available from Heubach: MONASTRAL® Magenta, MONASTRAL® Scarlet, MONASTRAL® Violet R, MONASTRAL® Red B, and MONASTRAL® Violet Maroon B. The following pigments are available from Clariant: DALAMAR® Yellow YT-858-D, Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM® Yellow HR, NOVOPERM® Yellow FGL, Hansa Brilliant Yellow 10GX, Permanent Yellow G3R-01, HOSTAPERM® Yellow H4G, HOSTAPERM® Yellow H3G, HOSTAPERM® Orange GR, HOSTAPERM® Scarlet GO, and Permanent Rubine F6B. The following pigments are available from Sun Chemical: QUINDO® Magenta, INDOFAST® Brilliant Scarlet, QUINDO® Red R6700, QUINDO® Red R6713, INDOFAST® Violet, L74-1357 Yellow, L75-1331 Yellow, L75-2577 Yellow, and LHD9303 Black. The following pigments are available from Birla Carbon: RAVEN® 7000, RAVEN® 5750, RAVEN® 5250, RAVEN® 5000 Ultra® II, RAVEN® 2000, RAVEN® 1500, RAVEN® 1250, RAVEN® 1200, RAVEN® 1190 Ultra®, RAVEN® 1170, RAVEN® 1255, RAVEN® 1080, and RAVEN® 1060. The following pigments are available from Mitsubishi Chemical Corp.: No. 25, No. 33, No. 40, No. 47, No. 52, No. 900, No. 2300, MCF-88, MA600, MA7, MA8, and MA100. The pigment may be a white pigment, such as titanium dioxide, or other inorganic pigments, such as zinc oxide and iron oxide.

Specific examples of cyan pigments include C.I. Pigment Blue-1, C.I. Pigment Blue-2, C.I. Pigment Blue-3, C.I. Pigment Blue-15, C.I. Pigment Blue-15:1, C.I. Pigment Blue-15:2, C.I. Pigment Blue-15:3, C.I. Pigment Blue-15:4, C.I. Pigment Blue-16, C.I. Pigment Blue-22, and C.I. Pigment Blue-60.

Specific examples of magenta pigments include C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-177, C.I. Pigment-184, C.I. Pigment Red-202, and C.I. Pigment Violet-19.

Specific examples of yellow pigments include C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-138, C.I. Pigment Yellow-151, C.I. Pigment Yellow-154, and C.I. Pigment Yellow-180.

Specific examples of black pigments include carbon black pigments. An example of an organic black pigment is aniline black, such as C.I. Pigment Black 1.

In some examples, the pigment may be a cyan, magenta, black or yellow pigment.

Although several examples of suitable pigments have been provided herein, it is to be understood that any other pigment or dye can be used that is useful in modifying the colour of the radiation curable inkjet ink.

Photoinitiator

The photoinitiator may be present in the in the inkjet ink in an amount ranging from about 0.2 wt. % to about 15 wt. %.

The photoinitiator may constitute any suitable photoinitiator. The photoinitiator initiates the polymerization and/or cross-linking of the radiation curable resin upon exposure to radiation. In some examples, the photoinitiator initiates the polymerization and/or cross-linking of the radiation curable polyurethane resin upon exposure to radiation.

Suitable photoinitiators include 1-[4-(2-hydroxyethoxy)phenyl]-2-hydroxy-2-methyl-1-propane-1-one (which is commercially available from BASF Corp. as IRGACURE® 2959): acyl phosphine oxide photoinitiators (e.g., IRGACURE® 819, commercially available from BASF Corp.); alpha hydroxy ketone photoinitiators (e.g., IRGACURE® 184, commercially available from BASF Corp.); Lodonium, (4-methylphenyl)[4-(2-methylpropyl)phenyl]-, hexafluorophosphate (1-) (which is commercially available from BASF Corp. as IRGACURE® 250); a high-molecular-weight sulfonium salt (e.g., IRGACURE® 270, commercially available from BASF Corp.); 2-benzyl-2-dimethylamino-1-(4-morpholinophenyl)butanone-1 (which is commercially available from BASF Corp. as IRGACURE® 369); alpha amino ketone photoinitiator (e.g., IRGACURE® 379, commercially available from BASF Corp.); a liquid blend of alpha hydroxy ketone/benzophenone photoinitiator (e.g., IRGACURE® 500, commercially available from BASF Corp.); 2,4,6-trimethylbenzoyl-diphenylphosphine oxide (commercially available as IRGACURE® TPO from BASF Corp.); 2,4,6-trimethylbenzoyl-diphenyl phosphinate (commercially available as IRGACURE® TPO-L from BASF Corp.); and a liquid photoinitiator blend of acyl phosphine oxide/alpha hydroxy ketone (e.g., IRGACURE® 2022, commercially available from BASF Corp.). Some other suitable photoinitiators include phosphine oxide derivatives, thioxanthone derivatives, and benzophenone derivatives.

In some examples, the photoinitiator is a water soluble photoinitiator. In some examples, the water soluble photoinitiator may be a trimethylbenzoylphenylphosphinic acid metal salt (TPA salt) having the following formula;

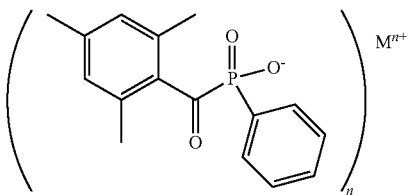

In which n is any integer from 1 to 5 and M is a metal with a valence of from 1 to 5. Examples of suitable metals include Li, Na, K, Cs, Rb, Be, Mg, Ca, Ba, Al, Ge, Sn, Pb, As, and Sb.

The TPA salt may be formed from ethyl (2,4,6-trimethylbenzoyl) phenylphosphinate (TPO-L) and a metal salt. The ethyl (2,4,6-trimethylbenzoyl) phenylphosphinate may be added to a suitable solvent (e.g., methyl ethyl ketone (MEK)) to form a solution, and then the metal salt may be added to the solution. The solution may be heated and stirred at a predetermined temperature for a predetermined amount of time to allow the reaction to take place. As a result of the reaction, a solid TPA salt may form. This salt may be collected, washed, and dried.

Example synthetic pathways for forming a lithium TPA salt (TPA-Li) and a sodium TPA salt (TPA-Na) are shown in the schemes below:

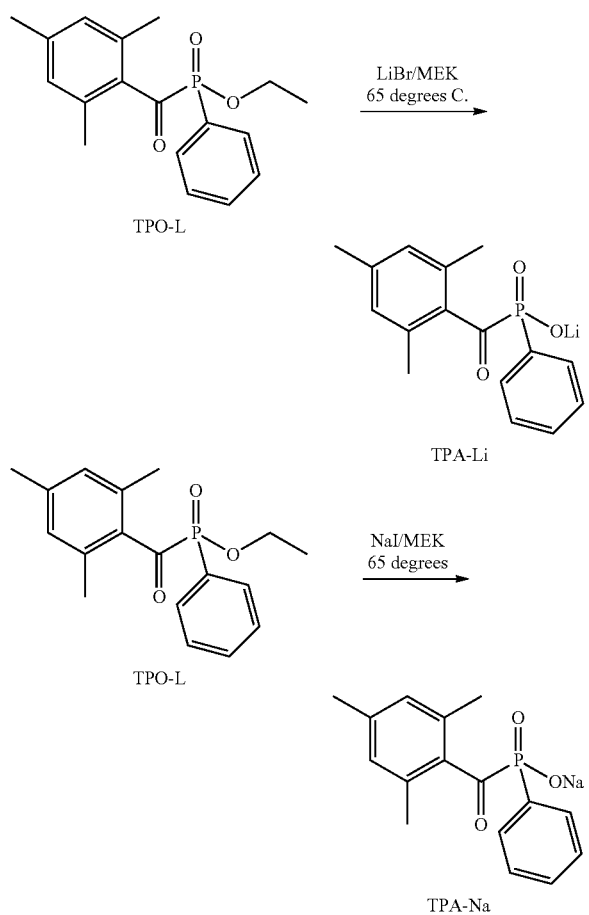

In one example, the water soluble photoinitiator can have a water solubility of at least 0.1 wt. %, When the water solubility is at least 0.1 wt. %, it means that of the total wt. % of the water soluble photoinitiator and water composition, at least 0.1 wt. % of the total is water soluble photoinitiator. In some instances, the water soluble photoinitiator may have a water solubility of at least 0.5 wt. %. In some instances, the water soluble photoinitiator may have a water solubility up to about 20 wt. %. In some examples, the water solubility of the water soluble photoinitiator may be high.

The water soluble photoinitiator may be used in combination with a sensitizer. The sensitizer may be a water soluble polymeric sensitizer that includes a functionalized anthrone moiety, a polyether chain, and an amide linkage or an ether linkage attaching one end of the polyether chain to the functionalized anthrone moiety. The anthrone moiety may be a thioxanthrenone moiety.

In one example, the polymeric sensitizer has the following formula:

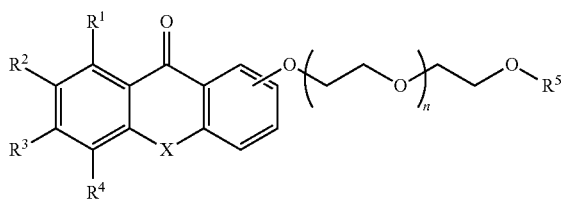

in which
$R^1$, $R^2$, $R^3$, $R^4$, and $R^5$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R^6$, $-CO-R^6$, $-CO-O-R^6$, $-CO-NR^6R^7$, $-NR^6R^7$, $-NR^6-CO-R^7$, $-NR^6-CO-O-R^7$, $-NR^6-CO-NR^7R^8$, $-SR^6$, $-SO-R^6$, $-SO_2-R^6$, $-SO_2-O-R^6$, $-SO_2NR^6R^7$ and a perfluoroalkyl group, in which $R^6$, $R^7$, and $R^8$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. Some examples of suitable alkyl groups include methyl, ethyl, propyl, isopropyl, butyl, isobutyl, pentyl, hexyl, and the like. An example of a suitable alkene group is an ethylene group. Some examples of suitable aryl groups include phenyl, phenylmethyl, and the like; and
X is O, S, or NH; and
n ranges from 1 to 200.

One example of a suitable sensitizer is termed M-TX-PEG-350, which comprises a thioxanthrenone moiety coupled to a methoxy-terminated PEG-350 chain.

In some examples, the radiation curable inkjet ink comprises a sensitizer in an amount of 0.1 wt. % to about 10 wt. %.

Diluent

In some examples, the radiation curable inkjet ink comprises a diluent. In some examples, the diluent is a reactive diluent. In some examples, the reactive diluent is a monomer or an oligomer. In some examples, an oligomer comprises from 2 to 100 monomers, in some examples, 3 to 50 monomers, in some examples, 4 to 25 monomers. In some examples, the reactive diluent is a monofunctional, difunctional, trifunctional or polyfunctional compound, which may be selected from acrylic monomers, methacrylic monomers and acrylamide monomers.

In some examples, the reactive diluent is an acrylate selected from 2-phenoxyethyl acrylate, isobornyl acrylate, isodecyl acrylate, hexanediol diacrylate, tripropyleneglycol diacrylate, trimethylolpropane triacrylate, propoxylated trimethylolpropane triacrylate, ethoxylated trimethylolpropane triacrylate.

In some examples, the radiation curable inkjet ink may comprise 5 wt. % or more diluent, in some examples, 10 wt. % or more, in some examples, 15 wt. % or more, in some examples, 20 wt. % or more, in some examples, 25 wt. % or more, in some examples, 30 wt. % or more, in some examples, 35 wt. % or more, in some examples, 40 wt. % or more, in some examples, 45 wt. % or more, in some examples, about 50 wt. % diluent. In some examples, the radiation curable inkjet ink may comprise 50 wt. % or less diluent, in some examples, 45 wt. % or less, in some examples, 40 wt. % or less, in some examples, 35 wt. % or less, in some examples, 30 wt. % or less, in some examples, 25 wt. % or less, in some examples, 20 wt. % or less, in some examples, 15 wt. % or less, in some examples, 10 wt. % or less, in some examples, about 5 wt. % diluent. In some examples, the radiation curable inkjet ink may comprise 5 wt. % to 50 wt. % diluent, in some examples, 10 wt. % to 45 wt. %, in some examples, 15 wt. % to 40 wt. %, in some examples, 20 wt. % to 35 wt. %, in some examples, 25 wt. % to 30 wt. % diluent.

EXAMPLES

Example 1

TABLE 1

UV curable inkjet ink composition

| Component | Wt. % |
|---|---|
| Surfynol ® CT-211 | 0.80% |
| DX-4000 | 0.50% |
| TPA Na | 0.50% |
| M-TX-PEG-350 | 0.25% |
| Curable PUD | 10.00% |
| DIC-QA magenta | 4.00% |
| Water | Balance |

Surfynol® CT-211 is a non-ionic surfactant from Evonik; DX-4000 is a fluorosurfactant from Dynax; Irgacure 819 DW is a photoinitiator from BASF; DIC-QA magenta is a magenta pigment dispersion from DIC. TPA-Na is water soluble photo initiator as described herein; M-TX-PEG-350 is water soluble sensitizer also as described herein. The curable PUD is an acrylate-based curable polyurethane dispersion of the type described herein.

The intermediate transfer member in an inkjet printer was heated to approximately 105° C. in accordance with Table 1 was jetted onto the intermediate transfer member to form an image. The temperature of the intermediate transfer member caused the radiation curable inkjet ink to at least partially dry to form an at least partially dried image on the intermediate transfer member. A UV-LED source was directed at the radiation curable inkjet ink on the intermediate transfer member, irradiating it with UV light. This caused the image to partially cure. The image was then transferred to a paper substrate (300 g Condat paper) to form a partially cured image on the substrate. The image was then irradiated with a further UV-LED source to fully cure the image and form a printed substrate.

Example 2

The intermediate transfer member in an inkjet printer was heated to approximately 105° C. A radiation curable inkjet ink in accordance with Table 1, but with the photoinitiator and sensitizer omitted, was jetted onto the intermediate transfer member to form an image. The temperature of the intermediate transfer member caused the radiation curable inkjet ink to at least partially dry to form an at least partially dried image on the intermediate transfer member. A E-Beam source (PCT Engineered System) was directed at the radiation curable inkjet ink on the intermediate transfer member, irradiating it with an electron beam. This caused the image to fully cure. The fully cured image was then transferred to a paper substrate (300 g Condat paper) to form a printed substrate.

While the method and related aspects have been described with reference to certain examples, those skilled in the art will appreciate that various modifications, changes, omissions, and substitutions can be made without departing from the spirit of the disclosure. It is intended, therefore, that the present method and related aspects be limited only by the scope of the following claims. The features of any dependent claim can be combined with the features of any of the other dependent claims or independent claims.

The invention claimed is:

1. A method of transfer inkjet printing comprising:
   jetting a radiation curable inkjet ink including a photoinitiator onto an intermediate transfer member of an inkjet printer to form an image, wherein the radiation curable inkjet ink comprises a liquid carrier;
   at least partially drying the radiation curable inkjet ink before irradiating the radiation curable inkjet ink, wherein at least partially drying the inkjet ink comprises removing at least 50 wt. % of liquid carrier from the inkjet ink;
   irradiating the radiation curable inkjet ink on the intermediate transfer member to form an at least partially cured image; and
   transferring the at least partially cured image to a substrate to form a printed substrate.

2. The method according to claim 1, wherein at least partially drying the inkjet ink comprises removing 70 to 80 wt. % of liquid carrier from the inkjet ink.

3. The method according to claim 1, wherein the method further comprises drying the at least partially cured image on the substrate to form the printed image.

4. The method according to claim 1, wherein the method further comprises irradiating the at least partially cured image on the substrate to form a fully cured image to form the printed image.

5. The method according to claim 1, wherein irradiating the radiation curable inkjet ink on the intermediate transfer member forms a fully cured image.

6. The method according to claim 1, the method comprising irradiating with visible light, ultraviolet light, electron beam irradiation, ionising radiation, non-ionising radiation, or any combination thereof.

7. The method according to claim 6, wherein the polyurethane resin comprises an acrylated polyurethane resin or a methacrylated polyurethane resin.

8. The method according to claim 1, wherein the method comprises irradiating with ultraviolet light.

9. The method according to claim 1, wherein the radiation curable inkjet ink on the intermediate transfer member is irradiated for 10 μs to 10 s to form the at least partially cured image.

10. The method according to claim 1, wherein at least partially drying the radiation curable inkjet ink includes heating the intermediate transfer member to 50° C. to 150° C. before the radiation curable inkjet ink is jetted onto the intermediate transfer member.

11. The method according to claim 1, wherein the radiation curable inkjet ink comprises a radiation curable polyurethane resin, a radiation curable acrylate resin, or a radiation curable methacrylate resin.

12. The method according to claim 1, wherein the radiation curable inkjet ink comprises water.

13. The method of claim 1, wherein the photoinitiator is a water-soluble photoinitiator.

14. The method of claim 1, wherein the radiation curable inkjet ink includes a pH stable and radiation curable polyurethane dispersion.

15. The method of claim 1, wherein the radiation curable inkjet ink includes a reactive polyurethane dispersion, and wherein the reactive polyurethane dispersion comprises an acrylamide-based radiation curable polyurethane dispersion, an allyl-based polyurethane dispersion, or a styrene-based polyurethane dispersion.

16. The method of claim 1, wherein at least partially drying the radiation curable inkjet ink includes directing a flow of gas at the radiation curable inkjet ink on the intermediate transfer member.

17. A transfer inkjet printing apparatus comprising:
an intermediate transfer member;
an inkjet print head; and
a radiation source;
wherein the transfer inkjet printing apparatus is adapted, in use, to jet a radiation curable inkjet ink including a photoinitiator onto the intermediate transfer member, wherein the radiation curable inkjet ink comprises a liquid carrier; at least partially dry the radiation curable inkjet ink before irradiating the radiation curable inkjet ink by removing at least 50 wt. % of liquid carrier from the inkjet ink; and irradiate the radiation curable inkjet ink to at least partially cure the radiation curable inkjet ink on the intermediate transfer member.

18. The transfer inkjet printing apparatus according to claim 17, wherein the radiation source is selected from an LED UV source, a Hg UV source, a Xenon arc lamp, a microwave UV source or an electron beam source.

19. The transfer inkjet printing apparatus according to claim 17, wherein the radiation curable inkjet ink includes a UV-LED curable resin comprising a reactive polyurethane.

20. The transfer inkjet printing apparatus according to claim 17, wherein the intermediate transfer member includes a silicone coated roller or drum.

* * * * *